May 23, 1939.  O. R. LESLEY  2,159,278
SUPERCHARGER
Filed Aug. 27, 1937
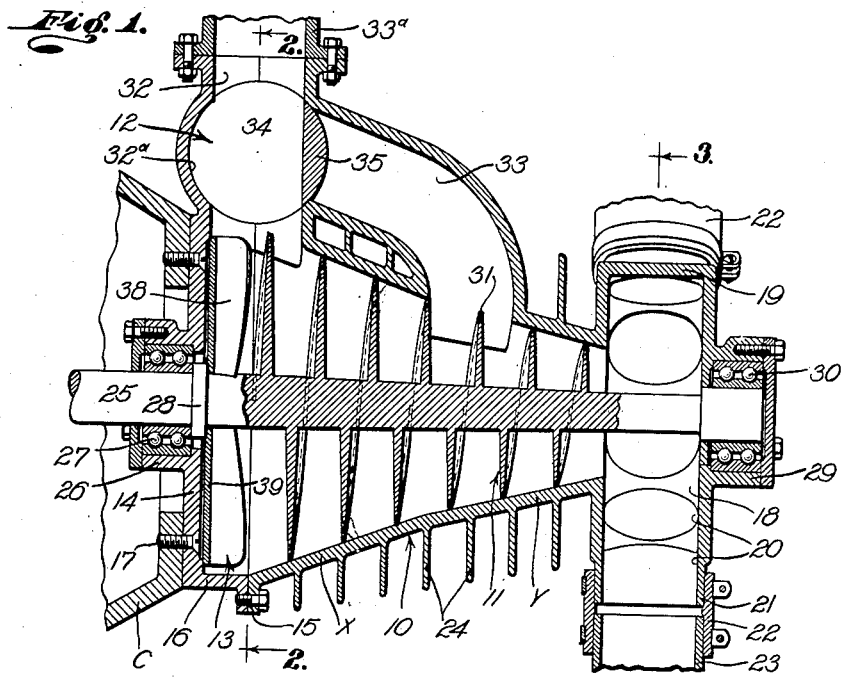
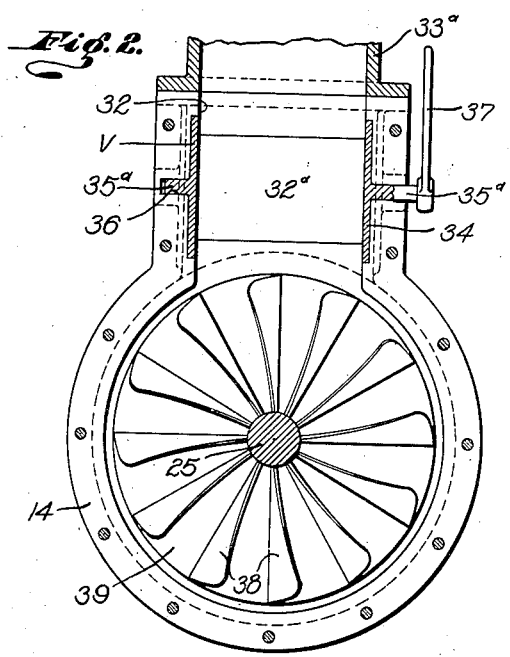
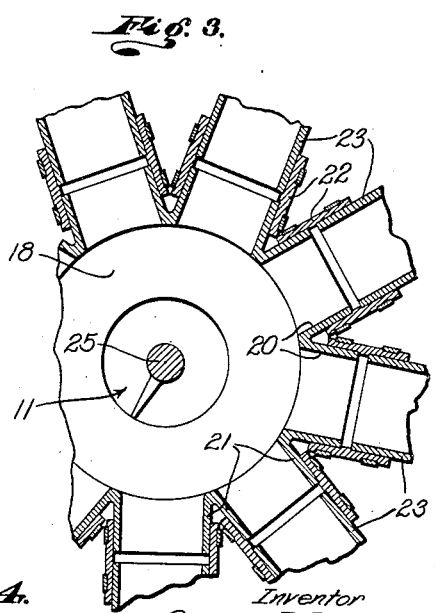
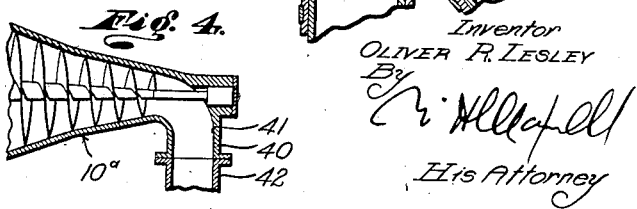
Inventor
OLIVER R. LESLEY
By
His Attorney Patented May 23, 1939

2,159,278

UNITED STATES PATENT OFFICE 2,159,278

SUPERCHARGER

Oliver R. Lesley, Los Angeles, Calif.

Application August 27, 1937, Serial No. 161,262

9 Claims. (Cl. 230—120)

This invention relates to a fluid handling device and relates more particularly to a supercharger for internal combustion engines. A general object of the invention is to provide a simple, practical and particularly efficient supercharger.

The internal combustion engines of aircraft and particularly the engines of aircraft designed for high altitudes are equipped with superchargers for supplying the air and fuel mixture to the cylinders at increased pressure and density. The superchargers now in general use for the purpose just mentioned are of the gear type and centrifugal blower type and have marked limitations and undesirable characteristics. The superchargers now employed on the engines of aircraft must be large and of great weight to effect any substantial increase in the pressure and density of the air and fuel mixture being supplied to the engine cylinders and it has been found impractical to design aircraft for use at very high altitudes where the air is very rarified because the present day superchargers for use in such installations are of prohibitive weight and size.

Another object of this invention is to provide a supercharger for use in connection with an internal combustion engine that is highly efficient and operable to effect a very substantial increase in the pressure and density of the air and fuel mixture.

Another object of this invention is to provide a supercharger that is very small and light in weight and yet capable of handling a large volume of the air and gas mixture and of increasing its density and pressure to a marked extent. The device or supercharger of the present invention is much smaller and lighter in weight per cubic foot of air and fuel mixture handled than the superchargers now in general use and, therefore, is particularly adapted for use in connection with aircraft engines where the size and weight of parts are of prime importance.

Another object of this invention is to provide a supercharger that is adapted to be regulated or controlled from a remote point at the will of the operator to produce the desired increase in the density of the air and fuel mixture.

Another object of this invention is to provide a supercharger of the character mentioned that operates to deliver the air and fuel mixture to the several cylinder manifolds at the same pressure or density, thereby assuring uniform efficiency in the operation of the engine cylinders.

Another object of this invention is to provide a supercharger of the character mentioned that thoroughly breaks up and atomizes the liquid fuel particles in the air and fuel mixture.

A further object of this invention is to provide a supercharger of the character mentioned that requires a minimum of power for its operation and operates with a minimum of heat loss, friction loss, etc.

The various objects and features of my invention will be fully understood from the following detailed description of typical preferred forms and applications of the invention, throughout which description reference is made to the accompanying drawing, in which:

Fig. 1 is a central longitudinal detailed sectional view of one form of supercharger provided by the invention. Fig. 2 is a transverse detailed sectional view taken as indicated by lines 2—2 on Fig. 1. Fig. 3 is a fragmentary transverse detailed sectional view taken as indicated by line 3—3 on Fig. 1 and Fig. 4 is a reduced fragmentary longitudinal sectional view of another form of the invention.

The device of the present invention is in the nature of a blower or compressor and the invention may be readily embodied in forms for use in various situations where a forced air draft is required or where it is desired to increase the density of a gas. In the following detailed description I will describe two typical forms of the invention intended primarily for use as superchargers for internal combustion engines and more particularly for use with the engines of aircraft, whether the engines be of the Diesel type or any other type. It is to be understood that the invention is not to be construed as limited or restricted to the specific forms or applications of the invention about to be described.

The embodiment of the invention illustrated in Figs. 1, 2 and 3 of the drawing includes, generally, a casing or body 10, a rotatable impeller 11 in the body 10, regulable means 12 for admitting fluid to the body 10 and means 13 associated with the impeller 11 for drawing or inducing the fluid into the body 10 and for feeding it to the impeller 11.

The casing or body 10 is a hollow structure for receiving the air and fuel mixture and for housing the impeller 11 and the means 13. The body 10 is elongate and is generally frusto-conical in shape. In the preferred construction the body 10 has two frusto-conical wall portions X and Y of different pitch or taper. The wall portion X is the largest frusto-conical portion of the body 10 while the wall portion Y constitutes the smaller wall portion of the body. The wall portion X is pitched at a greater angle to the central longitudinal axis of the body 10 than the portion Y and the two wall portions X and Y join at a zone or line substantially midway between the ends of the body. The internal surfaces of the body wall portions X and Y which define the compression chamber are preferably smooth and finished. The large end of the body 10 is closed by a plate or head 14. The head 14 may be connected with the body 10 by a suitable flange and bolt connection 15. In accordance with the invention the head 14 has a cylindrical wall 16 whose inner surface joins the internal surface of the body wall portion X at the outer or large end of the wall portion. The supercharger body 10 is adapted to be connected with or mounted on the crank case C of the engine. In the particular arrangement illustrated in the drawing the head 14 of the body 10 is rigidly secured to the engine crank case C by bolts or screws 17.

The interior of the frusto-conical body 10 forms the compression chamber of the supercharger, the air and fuel mixture being admitted to this chamber by the means 12 to be forced through the chamber under the action of the impeller 11 to the small end of the body. It is a feature of the invention that the body 10 is provided with an expansion chamber or pressure equalizing chamber 18. The body 10 is provided at its small end with a cylindrical wall portion 19 which defines the pressure equalizing chamber 18. The wall portion 19 may integrally join the small end of the body wall portion Y. The pressure equalizing chamber 18 has a diameter considerably greater than the small end of the main body chamber. The embodiment of the invention illustrated in Figs. 1, 2 and 3 of the drawing is intended to supply the air and fuel mixture to the cylinders of a radial type internal combustion engine and the chamber 18 is provided with a plurality of circumferentially spaced outlet ports 20. The ports 20 are provided in the periphery of the cylindrical body wall portion 19 and extend outwardly through suitable bosses 21 on the wall portion. Sleeves or couplings 22 may connect the bosses 21 with the manifolds 23 of the engine cylinders whereby the outlet ports 20 directly communicate with the cylinder manifolds. If desired or found necessary the body 10 may be provided with cooling means. In the particular case illustrated in the drawing the body wall portions X and Y have suitable radiating cooling vanes 24.

The impeller 11 is within the tapering chamber of the body 10 and is rotatable to effect the compression and desired movement of the air and fuel mixture being supplied to the cylinder manifolds 23. The impeller 11 is supported by a shaft 25. The shaft 25 extends centrally and longitudinally through the body 10 and may enter the body through an opening in the body head 14. A tubular boss 26 is provided on the head 14 and carries a suitable anti-friction bearing 27 for the shaft 25. A flange or shoulder 28 on the shaft 25 may cooperate with the bearing 27 for the transmission of the end thrusts on the shaft resulting from the action of the impeller 11. A tubular boss 29 is provided on the outer end of the body wall portion 19 and carries a bearing 30 which rotatably supports the end portion of the shaft 25. The shaft 25 may project into the crank case C of the engine and may be driven in any suitable manner.

The impeller 11 is in the nature of a helical thread or vane on the shaft 25. In the preferred form of the invention the impeller 11 is integral with the shaft 25 as shown in the drawing. The helical impeller 11 is frusto-conical being shaped to have its peripheral edge 31 clear the internal surfaces of the body wall portions X and Y with suitable tolerance. The impeller 11 is preferably a single vane of uniform helical pitch it being obvious that a double or triple helical impeller may be used and that the pitch of the impeller may be non-uniform, if desired. The helical pitch of the vane or impeller 11 is preferably such that the impeller has a relatively large number of convolutions. The impeller 11 is of substantial length having its large end in the plane of the large end of the wall portion X and having its small end in the plane of the small end of the wall portion Y. The surfaces of the impeller 11 are smooth and finished to act on the fluid with a minimum of friction.

It is a feature of the invention that the means 12 for admitting the air and fuel mixture to the body 10 is regulable to provide for any desired degree of supercharging or compressing action without offering excessive resistance or back pressure in the intake of the device. The supercharger preferably has a single inlet port 32 for directly communicating with the outlet manifold 33a of the associated carburetor (not shown). The port 32 is formed in suitable extensions of the body 10 and its head 14 and extends radially relative to the longitudinal axis of the body to communicate with the interior of the body at its large end. The port 32 is preferably of substantial fluid capacity and in the preferred construction is elongate in transverse cross section. The inlet port 32 has an intermediate portion 32a whose wall is cylindrically curved about an axis extending transversely of the port 32. A by-pass port 33 joins the portion 32a of the port 32. The by-pass port 33 is formed in a suitable integral part of the casing or body 10. The by-pass inlet port 33 communicates with the interior of the body 10 at a point between the ends of the body. In the preferred construction the port 33 communicates with the interior of that part of the body 10 defined by the wall portion Y at a point immediately adjacent the line of connection between the wall portions X and Y. It is to be observed that the inlet port 32 communicates with the intake end of the compression chamber portion defined by the wall portion X and that the by-pass inlet port 33 communicates with the intake end of the chamber portion defined by the wall portion Y.

The means 12 further includes a valve V for controlling the inlet ports 32 and 33. The valve V is a turnable or rotary valve arranged in the cylindrical portion 32a of the port 32. The valve V comprises two spaced end plates 34 and a bridge or web 35 extending between and connecting the plates 34. The plates 34 of the valve V are at the opposite ends of the port portion 32a and have axially projecting stems 35a rotatable in openings 36 to support the valve for turning. One stem 35a projects outwardly beyond the adjacent wall of the body 10. An operating lever 37 is fixed to the projecting portion of the said valve stem 35a to effect the turning of the valve V. It will be apparent that by attaching a rod, wire, or the like, to the lever 37 the valve V may be controlled from a remote point such as the operator's compartment or cockpit.

The web 35 of the valve V is proportioned to extend across and close the outer end of the by-pass port 33 and may be employed to close or partially close the inlet port 32. The outer surface of the web 35 is cylindrical to slidably cooperate with the wall of the port portion 32ᵃ. The valve V may be turned between the position where its web 35 completely closes off the port 33, as illustrated in Fig. 1, and a position where the web 35 closes off the inner part of the port 32 and leaves the port 33 open or in communication with the interior of the body 10. It will be apparent that by moving the valve web 35 to an intermediate position both ports 32 and 33 will be partially open and that by varying the position of the valve V the quantities of the air and fuel mixture admitted to the body 10 through the ports may be proportioned and controlled as desired. It is to be observed that the valve V is such that both ports 32 and 33 are not both fully closed at any one time.

The means 13 is provided to assist the impeller 11 in drawing or inducing the air and fuel mixture into the body 10 and to direct or feed the mixture to the large end of the helical impeller. The means 13 is optional, that is, it may be omitted if desired. The means 13 comprises a plurality of blades 38 rotatable with the impeller 11 and operating in the large end of the body 10. In the construction illustrated in the drawing the blades 38 are fixed to a disc 39 on the impeller shaft 25. The disc 39 may be integral with the impeller shaft 25 or may be fixed to or made integral with the flange 28 which in turn may be secured to the shaft as by a spline connection, by being shrunk on the shaft, or by any other means. The disc 39 is adjacent the inner surface of the head 14 and the blades 38 are arranged on the inner side of the disc. The blades 38 radiate outwardly from the impeller shaft 25 and are equally circumferentially spaced. The outer ends of the blades 38 have suitable clearance with the cylindrical wall 16 and are aligned with or in the same plane as the inner end of the inlet port 32.

The blades 38 are shaped to effectively feed or direct the air and fuel mixture to the large end of the impeller 11. The blades 38 are transversely pitched or curved rearwardly relative to the direction of rotation of the impeller 11 and their free or outer edges are curved inwardly from their outer ends whereby the blades are of greater width at their outer ends than at their inner ends. The air and fuel mixture entering through the port 32 is acted on by the blades 38 which force or direct it axially toward the adjacent end of the impeller 11. The air and fuel mixture slides or slips over the rearwardly curved rotating blades 38 to leave their inner edges and thus moves inwardly to the adjacent end of the impeller 11 to be received in the space defined by the spaced convolutions of the impeller and the surrounding wall of the body 10. The blades 38 also operate to assist in drawing or inducing the air and fuel mixture inwardly through the port 32. Thus the blades 38 operate to change the direction of the incoming air and fuel mixture and aid in drawing the mixture into the compressing chamber of the body 10.

Fig. 4 of the drawing illustrates a slightly modified form of the invention adapted for use in connection with an internal combustion engine having aligned cylinders and similar installations. In the arrangement illustrated in Fig. 4 of the drawing the casing or body 10ᵃ is provided at its small end with a laterally projecting boss 40. The boss 40 has an outlet port 41 communicating with the interior of the body 10ᵃ and delivering the compressed air and fuel mixture to the engine manifold 42. In this instance the compressed air and fuel mixture is discharged directly from the small end of the frusto-conical body 10ᵃ into the intake manifold 42. The impeller and the various other parts of the device illustrated in Fig. 4 may be the same as in the previously described embodiment of the invention.

In the operation of the form of the invention illustrated in Figs. 1 to 3 of the drawing let it be assumed that the impeller shaft 25 is driven or rotated at a high speed. In practice the impeller shaft 25 may be rotated at the rate of 10,000 R. P. M. or at a higher rate. The valve V may, of course, be set or positioned as desired to provide for the admission of the air and fuel mixture through the port 32 or through both the port 32 and the port 33. When the valve V is in the position best illustrated in Fig. 1 of the drawing the mixture enters the interior of the body 10 through the port 32. As described above, the blades 38 assist in drawing the air and fuel mixture into the body 10 and direct or feed the mixture to the receiving end of the frusto-conical helically pitched impeller 11. The rapidly rotating impeller 11 moves or forces the mixture axially through the frusto-conical body 10 from its large end to the pressure equalizing chamber 18 at the small end of the body. The air and fuel mixture thus moved axially through the body 10 is compressed as it moves through the gradually restricted interior of the frusto-conical body. The frusto-conical helically pitched impeller 11 rotating rapidly in the frusto-conical body 10 is operable to effect a marked increase in the pressure and density of the air and fuel mixture. Accordingly, the mixture is discharged into the chamber 18 under a high pressure and while moving at a substantial velocity.

In addition to effecting the above described compression of the air and fuel mixture the impeller 11 rotating at a rapid rate effectively breaks up and atomizes any liquid particles of fuel that may be present in the air and fuel mixture. The impeller 11 thus acts to complete the volatilization of the liquid fuel. The compressed air and fuel mixture discharged into the chamber 18 from the small end of the frusto-conical compression chamber is free to expand to a limited extent and discharges through the radial ports 20 to the intake manifolds 23 of the engine. It is to be particularly noted that the chamber 18 effects or provides for the equalization of the pressure and density of the air and fuel mixture delivered to the several manifolds 23.

In the event that the valve V is turned to the intermediate position where its web 35 partially obstructs the port 32 and partially obstructs the inlet end of the port 33 the air and fuel mixture is delivered to the frusto-conical body chamber at longitudinally spaced points. The portion of the mixture admitted by the port 32 is acted upon by the blades 38, as described above, and delivered to the large end of the impeller 11. This portion of the mixture undergoes what may be termed a first stage compression in the portion of the compression chamber defined by the body wall portion X. The portion of the air and fuel mixture admitted to the body 10 by the port 33 is acted on by the rapidly rotating impeller 11 and forced through the high compression portion of the body chamber defined by the wall portion Y. The air and gas mixture moving rearwardly through the tapering chamber of the frusto-conical body 10 from the port 32 also moves through the high compression part of the chamber defined by the wall portion Y and is thus subjected to what may be termed a second stage compression. Where the ports 32 and 33 are both open, as just described, it will be clear that a portion of the air and fuel mixture is subjected to compression at only the rear small portion of the frusto-conical compression chamber, so that the supercharger operates to develop a lower pressure than in the case described above, where all of the air and fuel mixture was admitted through the port 32. Accordingly, by varying the position of the valve V the supercharger may be regulated to produce the desired degree of compression of the air and fuel mixture. The regulable feature of the invention particularly adapts the supercharger for use in connection with the engines of aircraft whereby the engines may be made to operate efficiently at very high altitudes as well as at lower altitudes.

The compressor or supercharger provided by the invention embodies a minimum number of simple, inexpensive parts and is very small and compact. The casing or body 10 may be formed of duraluminum or the like, and therefore may be light in weight. The impeller 11 with its shaft 25 constitutes the single moving element of the device and may be supported and formed to rotate with a minimum of loss through friction.

Having described only a typical preferred form and application of my invention I do not wish to be limited or restricted to the specific details herein set forth, but wish to reserve to myself any variations or modifications that may appear to those skilled in the art or fall within the scope of the following claims.

Having described my invention, I claim:

1. A device of the character described including a body having a frusto-conical compression chamber, an inlet at the large end of the compression chamber, and a pressure equalizing chamber communicating with the small end of the compression chamber and of larger diameter than said small end of the compression chamber whereby a Venturi-tube action is produced upon movement of fluid from the compression chamber into the pressure equalizing chamber, there being outlets communicating with the said pressure equalizing chamber, and a frusto-conical helical impeller rotatable in the frusto-conical chamber to compress fluid therein and force it into the said pressure equalizing chamber.

2. A device of the character described including a body having a frusto-conical chamber, a pressure equalizing space joining the small end of the chamber, discharge ports communicating with said space at the peripheral wall thereof, said space having a diameter greater than the small end portion of the chamber, and at least one inlet port having lateral communication with the large end portion of the chamber, and a helical frusto-conical impeller rotatable in the chamber to force fluid through the chamber from its large end portion to said space to compress the same.

3. A device of the character described including a body having a tapered chamber, a lateral fluid inlet port communicating with the large end portion of the chamber, and a fluid outlet port communicating with the small end portion of the chamber, a tapered helical impeller arranged longitudinally in the chamber, means supporting the impeller for rotation, and means associated with the impeller for feeding fluid from the inlet port to the large end of the impeller, the last mentioned means comprising a plurality of blades rotatable with the impeller and substantially in the same transverse plane as the lateral inlet port, said blades being transversely curved rearwardly relative to the direction of rotation of the impeller and toward the small end of the chamber to direct the fluid from the lateral inlet port longitudinally to the impeller.

4. A device of the character described comprising a body having a frusto-conical chamber, a fluid outlet communicating with the small end of the chamber and fluid inlet ports communicating with one another at the exterior of the chamber and having communication with the chamber at points spaced longitudinally thereof, a frusto-conical helical impeller rotatable in the chamber to act on the fluid admitted by the inlet ports, and valve means controlling the said inlet ports.

5. A device of the character described comprising a body having a frusto-conical chamber, a fluid outlet communicating with the small end of the chamber and fluid inlet ports communicating with the frusto-conical chamber at longitudinally spaced points, a frusto-conical helical impeler rotatable in the chamber, and a single valve governing said inlet ports.

6. A device of the character described comprising a body having a frusto-conical chamber, a fluid outlet communicating with the small end of the chamber, a fluid inlet port communicating with the large end portion of the chamber, and a port joining said inlet port at a point removed from the chamber and communicating with the chamber at a point between its ends, a helical frusto-conical impeller rotatable in the chamber, and a proportionating valve controlling said inlet port and the second mentioned port.

7. A device of the character described comprising a body having a frusto-conical chamber, the wall of the large end portion of the chamber being pitched at a greater angle to the longitudinal axis of the chamber than the wall of the small end portion of the chamber the said portions extending in the same general direction, the body also having a fluid outlet at the small end of the chamber and a fluid inlet communicating with the large end portion of the chamber, a helical frusto-conical impeller in the chamber shaped to operate in both of said portions of the chamber with suitable clearance, and means supporting the impeller for rotation.

8. A device of the character described comprising a body having a frusto-conical chamber, the wall of the large end portion of the chamber being pitched at a greater angle to the longitudinal axis of the chamber than the wall of the small end portion of the chamber, the body also having a fluid outlet at the small end of the chamber, a fluid inlet communicating with the large end of the chamber and an inlet port joining the said inlet at a point remote from the chamber and communicating with the portion of the chamber whose wall is pitched at a lesser angle, valve means controlling the inlet and the inlet port, a helical frusto-conical impeller in the chamber shaped to operate in both of its said portions with suitable clearance, and a shaft supporting the impeller for rotation.

9. A device of the character described comprising a casing having a frusto-conical chamber, a pressure equalizing space joining the small end of the chamber, discharge ports radiating from said space and fluid inlet means for admitting fluid to the large end portion of the chamber, said means comprising a lateral inlet port joining the large end portion of the chamber, a by-pass port joining the chamber at a point between its ends and communicating with the inlet port, and a single proportionating valve governing the inlet port and the by-pass port, a rotatable shaft extending longitudinally in the chamber, radiating blades rotatable with the shaft in the large end of the chamber operable to feed fluid toward the small end of the chamber, and a helical frusto-conical impeller vane on the shaft for forcing the fluid through the chamber.

OLIVER R. LESLEY.